United States Patent [19]

Kebabian

[11] 4,397,025
[45] Aug. 2, 1983

[54] DUAL FREQUENCY LASER

[75] Inventor: Paul L. Kebabian, Acton, Mass.

[73] Assignee: Environmental Research & Technology, Inc., Concord, Mass.

[21] Appl. No.: 195,241

[22] Filed: Oct. 8, 1980

[51] Int. Cl.³ .............................................. H01S 3/13
[52] U.S. Cl. ..................................... 372/37; 372/28; 372/29; 372/20; 372/22
[58] Field of Search ...................... 372/28, 29, 37, 32, 372/20, 22

[56] References Cited

U.S. PATENT DOCUMENTS

3,464,024  8/1969  Bell et al. .............................. 372/37

Primary Examiner—William L. Sikes
Assistant Examiner—Léon Scott, Jr.
Attorney, Agent, or Firm—Schiller & Pandiscio

[57] ABSTRACT

A method and apparatus for operating a dual-frequency gas laser so as to controllably switch between frequencies makes use of a cavity so tuned that the comb of resonant frequencies is not commensurate with the frequency difference between the laser operating frequencies, and, in a preferred embodiment, with one of the resonant frequencies tuned to coincide with one of the operating frequencies. The cavity length and overall gain at each frequency are so selected that the spacing between resonant frequencies is greater than the breadth above unity gain of the individual peaks of the gain vs. frequency curve. The active material is subjected to a magnetic field which may be varied in a controlled manner. In a preferred embodiment, this field is applied normal to the optical axis of the resonant cavity, and an optical element within the cavity is arranged to act as a plane polarizer with its plane of polarization normal to the magnetic field.

16 Claims, 13 Drawing Figures

REPRESENTATIVE EMBODIMENTS OF SWITCHED DUAL-FREQUENCY LASERS

| CONFIGURATION | CHOPPING? | SINGLE FREQUENCY AT BOTH LINES? | L MAX. | L | H MAX. |
|---|---|---|---|---|---|
| LINEARLY POLARIZED | NO | NO | $\frac{1}{2B}$ | $\frac{n+1/2}{2D}$ | $H_1$ |
| | NO | YES | $\frac{1}{3B}$ | $\frac{n+1/3}{2D}$ | $H_1$ |
| | YES | NO | $\frac{1}{4B}$ | $\frac{n+1/2}{2D}$ | $2H_1$ |
| | YES | YES | $\frac{1}{5B}$ | $\frac{n+2/5}{2D}$ | $2H_1$ |
| CIRCULARLY POLARIZED | YES | YES | $\frac{1}{3B}$ | $\frac{n}{2(D\pm B)}$ | $H_1$ |
| | NO | YES | $\frac{1}{2B}$ | $\frac{n}{2\frac{(D\pm B)}{2}}$ | $H_1/2$ |

*Fig. 7*

DUAL FREQUENCY LASER

BACKGROUND OF THE INVENTION

This invention relates to lasers and more particularly to low-powered dual frequency gas lasers the output of which may be rapidly switched between the two frequencies in a controlled manner.

Low-powered gaseous lasers are well known and are widely used in a number of applications where their high degree of temporal and/or spatial coherence is of advantage. For a number of these applications, there is a need to be able to operate the laser system alternately at a pair of frequencies.

For example, a common technique for assaying a sample for the presence of or measuring the concentration of a wide variety of specific substances makes use of the selective absorption of radiation of different optical frequencies by the sample. In many instances, this technique may be simplified to observing the transmission of the sample at a pair of frequencies, one of which is strongly absorbed by the specific substance of interest but is not appreciably absorbed by other substances which may be present in the sample, and the other of which is absorbed by neither the substance of interest nor the rest of the sample. Non-dispersive selective absorption meters designed to make such observations are finding increasing application in such areas as process control, pollution monitoring, and the like. Such meters may employ lasers as the source of radiation, thereby taking advantage of the laser's high spectral resolution with a consequent surer discrimination between substances having similar or complex absorption spectra. While it is possible to devise an instrument to perform the required pair of observations simultaneously, a simpler, less complex and more easily realizable instrument results if the observations are made sequentially in rapid succession. Further, while it is possible to use a pair of lasers to provide the pair of frequencies, a single laser with dual frequency output is often more desirable. Consequently, dual frequency lasers which may be made to alternate between the two frequencies in a controlled manner are of utility in non-dispersive absorption meters. An example of such an apparatus is disclosed in U.S. Pat. No. 4,059,356.

Other potential uses for time-sharing dual frequency lasers include display generation, information processing, and communications, where the two frequencies could be used, for instance, to provide separate channels or to permit frequency shift encoding.

A variety of techniques have been employed to vary the frequency of a laser. To aid in understanding the principles of these various techniques, and to better distinguish between them and the operation of the present invention, a short exposition concerning laser operation may be helpful.

Briefly, lasers are amplifiers of radiant energy which function through the emission, stimulated by photons, of like photons. (As used herein, the term "photon" means a quantum of electromagnetic radiation more generally referred to as light-i.e., ultraviolet, visible, and infrared radiation). The gain or amplification factor of such an amplifier is highly frequency dependent and depends on the physical properties of the active material of the laser. The gain is greater than unity only for those photons for which the rate of stimulated emission exceeds the rate of absorption. Such gain is only possible if the active material of the laser (1) can exist in a pair of energy states which differ from one another by the specific energy associated with the photons of interest and (2) can more densely populate the higher energy state than the lower. In the materials of interest in the practice of the present invention, the differences in energy states are those associated with transitions between energy levels by the valence electrons of atoms or ions in a gas or plasma (i.e. those transitions associated with atomic spectra).

In operation, any of a large number of means, such as d.c. or radio frequency electrical discharge in, or optical excitation of, the active gaseous material, may be used to supply the energy necessary to raise or pump electrons to the higher energy level in order to satisfy the second of these conditions.

It will be appreciated that it is possible under appropriate circumstances for both of the conditions just enumerated to be met simultaneously by more than a pair of energy levels in a single material. Further, a mix of active materials may be used to produce greater than unity gain at two or more frequencies. In such cases the gain vs. frequency curve will display a number of peaks, each centered at a frequency for which the electronic transition meets these conditions. The relative heights of the various peaks will depend upon the corresponding transition probabilities, density of the inverted populations, linewidths, etc. The profile of each individual peak will, for the cases of interest, primarily reflect the Doppler and pressure broadening of the emitted radiation (due respectively to the random thermal motion of and collisions between the individual atoms or ions of the active material).

When used as a light source, a laser is operated as an oscillator, optical feedback being provided at at least one frequency for which the total gain of the laser, including allowances for losses in the feedback loop, is greater than unity. This feedback is achieved by enclosing the laser in an optical system so arranged as to circulate photons through the laser such that their round-trip transit time is commensurate with the reciprocal of the desired frequency (i.e., the optical path length is made commensurate with the desired wavelength). Thus, in the case of the Fabry-Perot resonator, typically used for this purpose, the separation between end mirrors is chosen to be an integral number of half wavelengths, since the round-trip optical path involves two reflections. Inasmuch as any practical sized optical resonator will have a round-trip optical path many wavelengths long, the desired frequency will be a high order overtone of the fundamental frequency of the resonator, which typically will be in the gigahertz range. Thus, such a resonator at any instant is simultaneously tuned to a number of optical frequencies, each differing from the next by a single cycle per round-trip optical transit time within the resonator. To a first approximation, laser oscillation is possible only for this comb of longitudinal mode resonant frequencies, and then only for those specific frequencies which coincide with a greater than unity gain (after allowance for losses in the optical path of the resonator) of the active material.

If the mode spacing is sufficiently small compared to the width of a gain line, then oscillation may be possible at more than one of the mode frequencies. However, when oscillation occurs at a given frequency, the gain around that frequency is reduced because of the increased rate at which atoms are removed from the upper state. If the line is homogeneously broadened (i.e., if the collisional width is comparable to or larger than the Doppler width), then this effect tends to suppress oscillation of all modes except the one with highest gain; likewise, when several gain lines share a common upper level (as is the case for the He-Ne laser), oscillation will occur at the frequency having the highest gain, and oscillation at the other line will be suppressed. If the lines are not homogeneously broadened, then, in general, simultaneous oscillation at several frequencies is possible.

With this brief outline of the operation of a gas laser, it will be appreciated that switching between significantly different frequencies (i.e. frequencies separated from one another by more than the Doppler and pressure broadened linewidth) is such a laser involves operating the laser so as to alternately oscillate at a pair of frequencies corresponding to two different transitions. Two basic prior art approaches for accomplishing this switching between gain peaks may be distinguished: (1) those approaches in which the resonant cavity is fixedly tuned to simultaneously resonate such that two of its resonant frequencies correspond to a pair of greater-than-unity-gain transitions in the active material, and the optical feedback is alternately spoiled at one or the other of these frequencies; and (2) those approaches in which the resonant cavity is so dimensioned that the comb of resonant frequencies is not commensurate with the difference in frequency corresponding to such a pair of transitions, and the tuning of the cavity is then varied so as to move the comb of frequencies back and forth, thereby providing resonances alternately at one or the other frequency corresponding to the pair of transitions.

The first of the above enumerated approaches may be accomplished by varying the intracavity absorption, thereby altering the overall system gain to less than unity at the frequency absorbed, by such methods as alternately introducing and withdrawing appropriate optical filters into and out of the optical path, or changing the frequency of an interference filter (as by rocking), within the cavity. Alternatively, a movable dispersing element (such as a grating or a prism) may be placed within the cavity and oscillated or rocked back and forth so as to alternately prevent optical feedback at all but one or the other of the frequencies corresponding to greater than unity gain. In addition to requiring additional components in the optical path within the resonant cavity of the laser oscillator, such apparatus accomplishes the switching from one gain peak to the other by physically moving a component which often is highly position sensitive.

The alternative approach, that of varying the tuning of the cavity, is accomplished by altering the optical path length (i.e. the product of the geometrical length of the optical path and the index of refraction of the medium) within the resonant cavity, thereby changing the transit time and thus the comb of resonant frequencies. Such changes in path length may be accomplished by physically altering the geometrical length of the path, as by physically moving a mirror which in part defines the path, or by changing the index of refraction within at least a portion of the cavity as by altering the pressure of a gas or inducing birefringence in a crystal. These designs require either physically moving a critical component defining the cavity, the alternate pumping and evacuation of gas into and out of a portion of the cavity, or the addition of an exotic optical component to the optical train in the cavity.

OBJECTS OF THE INVENTION

Accordingly, it is an object of the present invention to provide an improved method for the operation of a dual frequency gas laser oscillator.

It is a further object of the present invention to provide a method of time-shared operation of a dual frequency gas laser oscillator which does not require optical components beyond those required to contain the active gaseous material and define the optical cavity.

Yet another object of the present invention is to provide such a method of time-shared dual frequency laser oscillator operation which does not depend upon physically moving components of the laser, altering the pressure of a gas within the laser cavity, nor the use of exotic electro-optical materials.

SUMMARY OF THE INVENTION

These and other objects are met in the present invention of an apparatus comprising a dual-frequency gas laser in a resonant cavity so tuned that the comb of resonant frequencies is not commensurate with the frequency difference between the two operating frequencies of the laser, and with one of the resonant frequencies so tuned as to coincide with one of these operating frequencies. The cavity length and the overall laser gain are so selected that the spacing between resonant frequencies is greater than the breadths above unity gain of the individual peaks of the gain vs. frequency curve. The apparatus further comprises means for subjecting the active material of the laser to a controlled variable magnetic field. In a preferred embodiment, this field is of variable magnitude and is so applied as to be normal to the optical axis of the resonant cavity, and at least one of the optical elements within the resonant cavity is arranged to act as a polarizer with a plane of polarization normal to the magnetic field direction. This polarizing function may be performed by the Brewster-angle window(s) normally employed to terminate the plasma tube of the laser.

As the magnetic field strength is increased from zero, the energy levels of the active material are perturbed, and as a consequence the emission spectrum of the material (i.e., the gain vs. frequency curve) is modified. In the simplest case (the transverse normal Zeeman effect) each spectral peak is split into three components, with the higher- and lower-frequency components of each triplet moving away from a stationary central peak. The outer components are plane polarized normal to the magnetic field, while the central peak is plane polarized parallel to the field. In this embodiment, the setting of the polarizer relative to the field acts to spoil the gain of the central non-displaced component while not affecting the gain of the magnetically displaced components. Thus, by varying the magnetic field amplitude the frequencies of the peaks of the gain curve of the laser can be displaced in a selective manner such that alternately one or another gain peak can be brought into coincidence with a (fixed) cavity resonance frequency.

It will be readily recognized that, inasmuch as the plasma tube of a typical gas laser is terminated with Brewster-angle windows, this method of frequency modulation does not require additional optical components within the laser system. Further, it will be appreciated that this method of frequency switching requires neither physically moving any component of the laser system, nor laborious and time consuming alteration of gas pressure within the resonant cavity, nor use of exotic electro-optical materials.

Other objects of the invention will in part be obvious and will in part appear hereinafter. The invention accordingly comprises the method and the apparatus possessing characteristic features exemplified in the following detailed disclosure, the novel features of which are set forth in the appended claims.

BRIEF DESCRIPTION OF THE DRAWINGS

For a fuller understanding of the nature and objects of the present invention, reference should be had to the following detailed description taken in connection with the accompanying drawings wherein.

Like reference characters on the drawings indicate like parts in the several figures.

DETAILED DESCRIPTION

Figure 1:
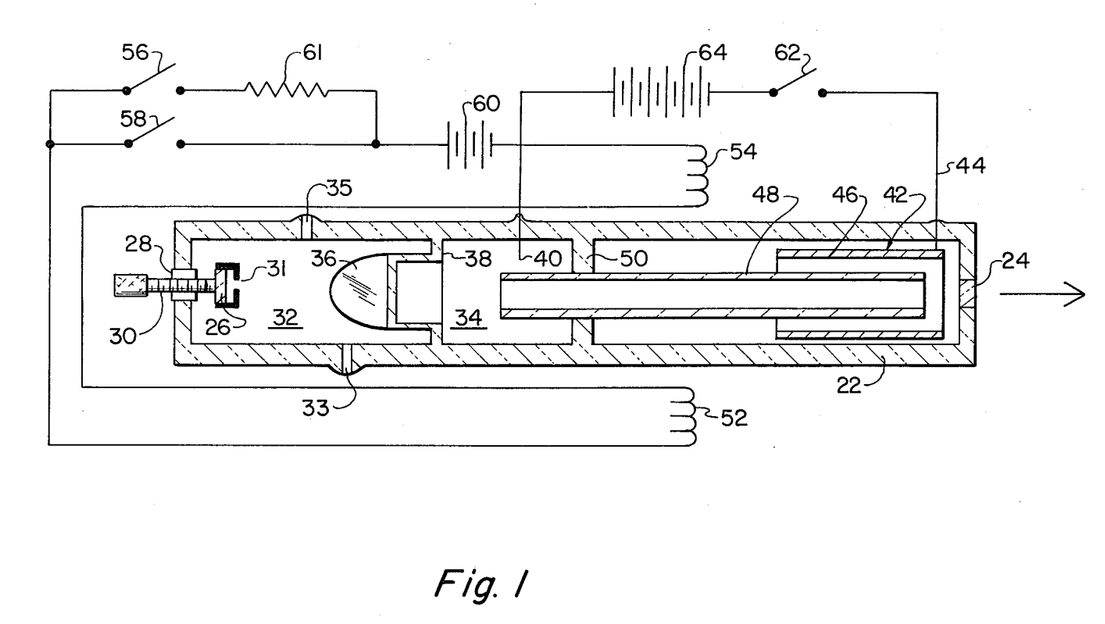
FIG. 1 is a schematic diagram partly in longitudinal cross-section of an apparatus suitable for use in realizing the process of the present invention.

Turning first to FIG. 1, as a suitable form of resonant cavity laser there will be seen a schematic cross-section of an apparatus for use in realizing the process of the present invention comprising an elongated hollow glass tube 22 having coaxially mounted at opposite ends thereof mirrors 24 and 26 defining between them a Fabry-Perot resonator. The latter are preferably confocal spherical mirrors of the type well known in the art, or the equivalent. In the particular embodiment illustrated, it is intended that the laser radiation be emitted axially through mirror 24 (i.e. toward the right in the figure), and therefore this mirror should be partially transmitting at the frequencies of interest, and accordingly is preferably finished with a slightly transmissive multi-layer dielectric coating as is well known in the art. Mirror 26 is intended to be non-transmitting, and accordingly may be provided with a high-reflectivity multi-layer coating. Preferably, the separation between mirrors 24 and 26 is adjustable, as may be provided for by a precision nut 28 and screw 30 supporting mirror 26 from tube 22. It will be appreciated that this form of adjustment is shown only for ease of exposition, and that in practice the adjustment may be accomplished in any of a number of other ways, as by mounting mirror 26 on a piezoelectric element or the like. To limit the cavity resonance to the fundamental transverse mode, an aperture stop 31, also well known in the art, is mounted adjacent mirror 26. It will be appreciated that plural mode limiting apertures might also be used.

Tube 22 is divided into two portions, 32 and 34, by a window 36 and a partition 38, which separate and seal the two portions from one another. Portion 32 of tube 22, which contains movable mirror 26, may be either sealed off or open to atmosphere or free to accept samples, depending upon the intended use of the system. To this end, portion 32 may be provided with inlet and outlet ports 33 and 35. Portion 34 constitutes a plasma tube, which is filled with the active medium of the laser. Window 36 is supported at Brewster's angle with respect to the longitudinal axis of tube 22 by partition 38. In FIG. 1, window 36 is shown with its plane of incidence normal to the plane of the figure and parallel to the longitudinal axis of tube 22.

Extending through the wall of tube 22 into the interior of portion 34 are a pair of spaced-apart electrodes, such as anode 40 and cathode 42. Anode 40 can be simply a stub of an electrically conductive lead-in. Similarly, the cathode 42 includes a lead-in 44 that extends through the wall of tube 22. Cathode 42 also includes an open-ended hollow elongate metallic tube 46 connected to lead-in 44 and disposed coaxially within portion 34 of tube 22 adjacent fixed mirror 24. An open-ended hollow elongate glass discharge tube 48 is disposed coaxially within portion 34 of tube 22 extending from within tube 46 of cathode 42 to a point adjacent window 36. Discharge tube 48 is supported by glass wall 50 which is attached to and extends radially inward from the wall of tube 22. Wall 50 also serves as an insulating barrier between cathode 42 and anode 40, preventing an electrical discharge between them except through discharge tube 48. It will be appreciated that cathode 42 could either be a cold cathode, as shown, or a heated cathode, and further, the cathode could be situated in a separate cathode bulb communicating with the interior of portion 34 of tube 22 rather than being disposed coaxially within tube 22.

The interior portion 34 is filled with the active material of the laser, chosen, depending on the desired frequencies, from any of a large number of laser gas mixtures known to provide greater than unity gain at more than one frequency (e.g., Helium-Neon, Helium-Xenon, Argon, etc). For reasons that will become apparent hereinafter, pairs of gain lines, to be of interest, must be separated from one another by at least three halves their line widths. To limit laser operation to only a selected pair of frequencies in some mixtures, the gain of the laser oscillator may be deliberately spoiled, as by selectively coating mirrors 24 or 26 or window 36, to increase the system losses at the undesired frequencies, as is well known in the art.

It will be appreciated that the structure thus far described in detail is that of a typical DC-excited gas laser, well known in the prior art, having a Fabry-Perot resonant cavity in which the movable mirror is outside of the plasma tube, being separated from the active material of the laser by a Brewster angle window. It will be understood that other forms of resonant cavity laser (e.g., double Brewster-windowed plasma tubes, ring lasers, and the like) can also be used in the practice of the present invention, provided the stimulated emission corresponds to electronic transitions in individual atoms and that stimulated emission can take place at a pair of frequencies separated from one another by at least a few times the width of the widest gain line.

Disposed about the outside of tube 22, opposite discharge tube 48, is an electromagnet, shown schematically as a pair of series connected solenoids 52 and 54, disposed with their magnetic axes substantially coaxial and normal to both the axis of tube 22 and the plane of incidence of window 36. Solenoids 52 and 54 are preferably disposed along the length of plasma tube portion 34 of tube 22 such that, when they are energized, the resulting magnetic field is substantially uniform along the length of the gaseous discharge within the plasma tube. The electromagnet comprising solenoids 52 and 54 is designed, by methods well known in the art of magnet design, to produce a substantially uniform magnetic field within plasma tube 22 having a peak field strength dependent upon the spacing of cavity resonant frequencies, as will be described hereinafter. It will be understood that the electromagnet may be multi-coiled and further may be provided with high permeability cores and yokes in the realization of the design. Electromagnetic solenoids 52 and 54 may be energized in a controlled way, as by closing switches 56 and 58, thereby connecting the solenoids to a source of DC, such as that shown schematically by battery 60, respectively through a resistance 61 and directly. For a battery voltage v and a solenoid resistance $r_s$, the current through the solenoid will be $v/r_s$ when switch 58 is closed and $v/(r_s+r_r)$, where $r_r$ is the resistance of resistor 61, when switch 58 is open and switch 56 is closed. It will be appreciated that switches 56 and 58 are shown merely as an aid to clarity in the following discription of the operation of the system, and that in practice other forms of control of the current in the electromagnets might be used, and that, for instance, the current can be made to be variable in response to a modulating signal, or can be made cyclic, as by use of a sawtooth, square wave, or sinusiodal signal generator.

The electrical circuitry controlling the laser system of FIG. 1 is completed by switch 62 and DC source 64, which provide power to anode 40 and cathode 42. It will be understood that source 64 incorporates the necessary ballast to compensate for the negative resistance of the plasma tube. It will also be appreciated that the plasma could equally well be excited by other means, e.g., by high frequency radiation from external electrodes.

Figure 2A:
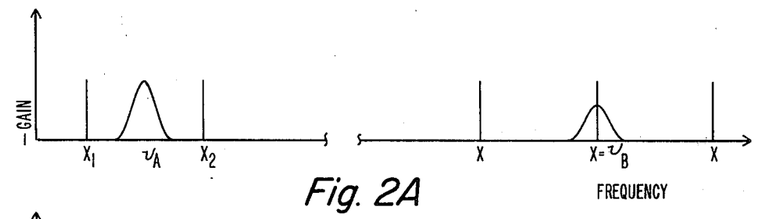
FIGS. 2A through 2C are plots of cavity resonant frequencies and of overall laser system gain vs. frequency illustrative of various stages in the operation of the process of the present invention for one mode of operation of the invention.
Figure 2B:
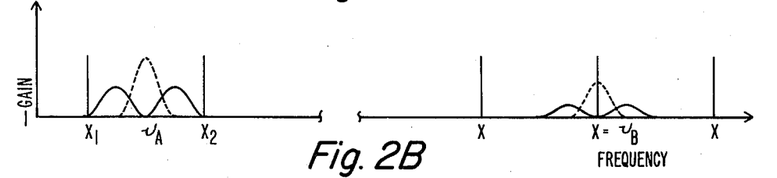
Figure 2C:
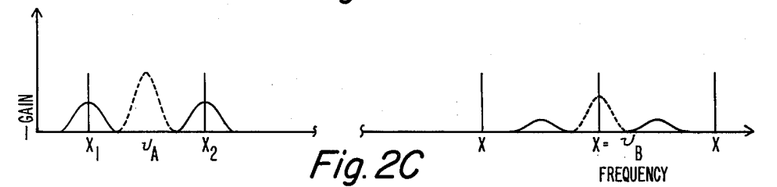
Figure 3A:
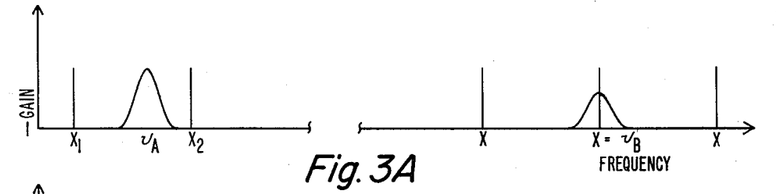
FIGS. 3A through 3C are plots similar to those of FIGS. 2A through 2C illustrative of another mode of operation of the present invention.
Figure 3B:
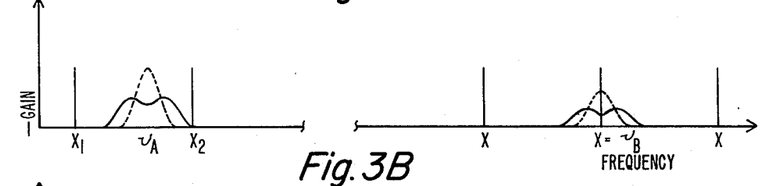
Figure 3C:
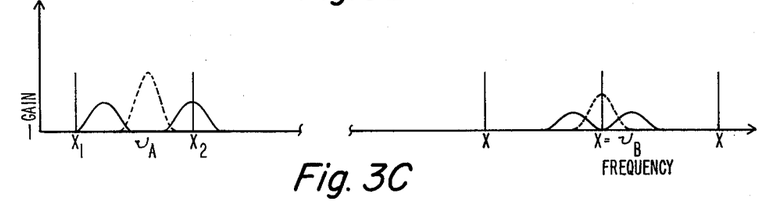

The operation of the embodiment just described may be best understood by reference to FIGS. 2 and 3 which are idealized graphs of laser gain against frequency for various operating conditions of the laser system with the frequency axes corresponding to unity system gain. As previously mentioned, the optical resonator, in this case the Fabry-Perot cavity formed by mirrors 24 and 26, is many wavelengths long, and consequently any optical frequency for which it is tuned will be a high order overtone of its fundamental frequency. The cavity is resonant at those frequencies for which the net phase shift of a wave making a round trip is 0. That is, resonant wavelengths $\lambda_m$ will satisfy the relation $$\lambda_m = 2L/(m - \Phi/2\pi),$$

where L is the optical path between mirrors 24 and 26, m is an integer, and $\Phi$ is the phase shift in radians due to such effects as diffraction by apertures within the cavity. Ordinarily $\Phi$ depends only weakly on frequency, but differs significantly for different transverse modes of the resonator. If frequency, $v$, is measured in wave numbers, then successive resonant frequencies of the cavity are spaced apart by $1/(2L)$, neglecting the frequency dependence of $\Phi$. This mode spacing is indicated in FIGS. 2 and 3 by the indicia marked x along the frequency axes.

Also indicated in the figures are laser system gain lines, centered about frequencies $v_A$ and $v_B$, corresponding to a pair of transitions for which the gain is greater than unity in the (magnetically undisturbed) active laser material contained in plasma tube portion 34. As mentioned hereinbefore, the emission (and absorption) and consequently, the laser gain corresponding to a transition between energy states in the active material is not all at a single frequency, but is spread over a narrow range of frequencies about the nominal frequency. This broadening is primarily due to the random thermal motion of, and collisions between, individual atoms of the active material. As an example, for a 10:1 helium-neon mixture at 3.5 torr, the 2948 cm$^{-1}$ lines reflect almost equally the effect of Doppler and pressure broadening, and for a 5 cm long plasma tube 4 mm in diameter operating at 5 ma current, the line widths are typically 0.018 cm$^{-1}$ wide at half maximum, the stronger line, at 2947.9 cm$^{-1}$ having a width of 0.023 cm$^{-1}$ for which gain exceeds loss when used in a typical optical system.

In accordance with the present invention, the pair of gain lines must be spaced apart a distance several times their widths, and the spacing between successive resonant frequencies is at least the width of the broadest gain line. Accordingly, for such a laser operating at the previously mentioned He-Ne wavelengths, the maximum overall length of the cavity defined by mirrors 24 and 26 should be no greater than that given by $1/(2L_{max}) = 0.023$ cm$^{-1}$, or $L_{max} = 21$ cm. To make the operation of the invention most readily apparent, and to illustrate a feature of the invention which can be achieved with a greater mode spacing, FIG. 2 has been drawn with the mode spacing twice the greater than unity system gain of either of a pair of equally broad gain lines. That is, for the figure L is given by $1/2L = 2B$, where B is the breadth of one of the lines. For the He-Ne laser example cited above, this would correspond to a mode spacing of 0.046 cm$^{-1}$ and an L of 11 cm. As will be described hereinafter, other ratios of line width to line spacing may also be advantageously used in the practice of the present invention.

When operated in the manner illustrated in FIG. 2, the system is adjusted so that one of the gain line frequencies (here shown as $v_B$) is coincident with a resonant frequency of the laser cavity. This is accomplished by displacing mirror 26, as by manipulation of precision screw 30. To a first approximation (neglecting phase shift $\Phi$), the separation between mirrors 24 and 26 is set so as to make the optical path length between the mirrors commensurate with the reciprocal frequency. More precisely, L is chosen such that $v_B = 1/\lambda_m = (m - \Phi/2\pi)/(2L)$. Since $L >> \lambda_m$, a small fractional change in L will shift the resonant frequencies by more than their spacing, while the spacing itself will be altered by only a small increment. Thus, this condition may be met independently of the conditions the present invention sets on mode spacing.

Additionally, the optical path length L is also chosen such that the product of twice the path length and the difference in the frequencies of the gain peaks, $2L(v_B - v_A)$, is not an integer. That is, the cavity is so tuned that the resonant frequency spacing is not commensurate with the difference in gain peak frequencies. The simplest case, illustrated in FIG. 2, establishes a value for L such that $2L(v_B - v_A)$ is an odd half-integer

[i.e., $2L(\nu_B-\nu_A)=1/2, 3/2, 5/2, \ldots$, or $2L(\nu_B-\nu_A)=n+\frac{1}{2}$, where $n=0, 1, 2, 3, \ldots$]. Inasmuch as the cavity has been tuned so that one of its resonant modes corresponds to one of the gain peaks, this condition places the other gain peak midway between a pair of resonant frequencies, $x_1$ and $x_2$, as shown in FIG. 2A.

(In order to insure the greatest path length in the active material of the laser, the largest value of L meeting the odd half-integer condition and consistent with $L_{max}$ will ordinarily be used. Thus, $L=(n+\frac{1}{2})/2D$, where n is the largest integer such that $L<L_{max}$ and where $D=(\nu_B-\nu_A)$, is a preferred value for the optical path length between mirrors 24 and 26. The length of the plasma column might be maximized in this way, so as to obtain maximum power from the laser, for example. Note, however, that FIG. 2 does not correspond to this choice of L.)

If the laser of FIG. 1 is adjusted as described above (i.e., with $L=L_{max}/2$), the closing of switch 62 will activate the laser, and the condition schematically illustrated in FIG. 2A will obtain. It will be understood that, in this condition, oscillation will occur only at frequency $\nu_B$, as only for this frequency does a resonance of the optical cavity coincide with a frequency of greater than unity gain in the laser system. Further, as is well known, for low gain laser operation the radiation produced by a system such as that shown in FIG. 1 will be plane polarized, since the Brewster angle window 36 acts to spoil the system gain for that radiation for which the electric vector is normal to the plane of incidence of the window. Consequently, the solid curves centered at $\nu_A$ and $\nu_B$ in FIG. 2 represent only the system gain for radiation plane polarized parallel to the window's plane of incidence, the system having less than unity gain for radiation which is polarized normal to this.

FIGS. 2B and 2C represent the situation as solenoids 52 and 54 are energized first to half strength (FIG. 2B) and then to full strength (FIG. 2C), by sequentially closing switches 56 and 58, thereby connecting the solenoids to the power supply represented by battery 60 firstly through resistance 61 and then directly. The applied magnetic field perturbs the energy levels within the active material, and as a result the gain spectrum of the laser is affected, each gain peak becoming multiple. In the simplest case (the normal Zeeman effect) there is a splitting of the central peak, with twin satellite peaks up- and down-frequency shifted from the central frequency by an amount depending on the magnetic field strength. The magnitude of this shift, in wavenumbers, is given by $$\Delta\nu=4.67\times10^{-5}H,$$

where $\Delta\nu$ is the frequency difference between one of the satellite peaks and the central frequency and H is the magnetic field strength in Oersteds. In most cases of practical interest, the situation is somewhat more complicated, in that the anomalous Zeeman effect prevails, and the line shift is related to the magnetic field strength by a different coefficient. Thus, for the 2948 cm$^{-1}$ neon lines, the actual shift is about 9% larger (i.e., $\Delta\nu=5.09\times10^{-5}H$). In the anomalous Zeeman effect, each component of the Zeeman-split line may itself be further divided into a number of sub-components. For the magnetic fields of interest, these components are unresolved, and merely act to effectively broaden the lines.

The various components of the Zeeman-split gain spectrum are variously polarized (i.e., the perturbed energy levels in the active material result in various transitions which preferentially emit and absorb variously polarized radiation). The nature of this polarization depends upon the orientation of the magnetic field with respect to the radiation propagation direction. In the preferred embodiment illustrated in FIG. 1, the field formed by solenoids 52 and 54 is normal to the optical axis defined by mirrors 24 and 26, and the observed effect is the transverse Zeeman effect: each line of the spectrum of the active material is divided into components plane polarized with the electric vector parallel to the magnetic field direction and components plane polarized with the electric vector normal to the magnetic field direction. In the normal transverse Zeeman effect, each line becomes a triplet having a central component at the original frequency which is polarized parallel to the magnetic field and a pair of half-amplitude up- and down-shifted peaks each polarized normal to the field. Since solenoids 52 and 54 are also aligned with their axes normal to the plane of incidence of Brewster angle window 36, the central peak of the triplet is polarized normal to the plane of incidence of the window, and the system gain for this radiation is spoiled. The outer components of the triplet are passed without loss. Consequently, the gain spectrum of the preferred apparatus with solenoids 52 and 54 energized consists of doubled gain peaks, as represented by the solid curves on either side of $\nu_A$ and $\nu_B$ in FIGS. 2B and 2C.

In accordance with the present invention, the maximum value of the magnetic field strength is chosen so as to produce a frequency shift $\Delta\nu$ sufficient to displace one of the satellites of the normally non-oscillating gain peak (i.e., as illustrated in FIG. 2A the peak at frequency $\nu_A$) to an adjacent cavity resonant frequency, as shown schematically in FIG. 2C. As the resonant frequencies of FIG. 2 have been set such that the normally non-oscillating gain peak at frequency $\nu_A$ is midway between adjacent cavity resonances $x_1$ and $x_2$, and since the mode spacing has been chosen so that $x_2-x_1=2B$, the required frequency shift, $\Delta\nu_{max}$ is B, and for the normal Zeeman effect the maximum magnetic field strength in Oersteds, $H_{max}$, is given by $$H_{max}=2.14\times10^4B,$$

where B is in centimeters$^{-1}$. For the He-Ne example previously cited, the coefficient is some 9% smaller, or about $1.96\times10^4$, and as B is 0.023 cm$^{-1}$, $H_{max}$ would be about 451 Oersteds for the case illustrated.

The application of such a field to the active material in discharge tube 48 will result in the situation depicted in FIG. 2C, where both of the satellites of the gain peak at frequency $\nu_A$ have been shifted to cavity resonant frequencies $x_1$ and $x_2$ respectively. In this condition, the laser system can sustain oscillation at either of these frequencies. Simultaneously, the gain peak normally centered at frequency $\nu_B$ has been split, and both of its satellites have been frequency shifted through similar frequency differences, and therefore are situated between cavity resonances and cannot sustain oscillation. The central peaks of the normal transverse Zeeman triplet, schematically indicated by the dashed curves, are, as previously indicated, supressed by Brewster window 36. Thus, application of the full strength magnetic field has the effect of simultaneously stopping the oscillation of the laser at frequency $\nu_B$ and starting it at one or both of the resonant frequencies $x_1$ and $x_2$ adjacent $\nu_A$.

It will be appreciated that for frequency $x_2$ to be different from $\nu_B$, the arrangement so far described further requires that $D = \nu_B - \nu_A$ be at least 3/2 the resonant frequency spacing, or at least three times the greater than unity system gain breadth, B, of the widest gain line.

The application of the half strength magnetic field results in a shift by a quarter of the spacing between adjacent cavity resonant frequencies of the gain peak satellites as depicted in FIG. 2B. In the case illustrated, since the above unity system gain width of each gain peak is half the mode spacing, the laser will not oscillate at either frequency. Thus, if resistance 61 of FIG. 1 is chosen to limit the current passed through solenoids 52 and 54 when switch 56 alone is closed to half that passed when switch 58 is closed, and power supply 60 is selected to provide a sufficient current to just produce $H_{max}$ when switch 58 is closed, the laser output frequency may be controlled by switches 56 and 58. If both switches 56 and 58 are open, the laser output is at frequency $\nu_B$ (FIG. 2A). If switch 56 alone is closed, laser oscillation ceases (FIG. 2B). If switch 58 is closed laser oscillation occurs at $\nu_A \pm \Delta\nu_{max}$ (that is, at either or both of $x_1$ and $x_2$, FIG. 2C), regardless of the status of switch 56.

It will be understood that the sequence of operations just described may also be automated, and further, be made cyclic, as for instance by a pulse generator and appropriate switching logic. This type of operation may be of advantage if the laser system is intended for use with a detection system employing a synchronous detection scheme.

If the null provided by the half field strength shift of the Zeeman split lines to non-resonance frequencies is not required, not only may switch 58 and resistance 61 (or their equivalents) be omitted, but the mode spacing may also be made closer. In this regard, it should be noted that switching between the pair of frequencies (or more properly between one frequency and the cavity resonances adjacent the other) only requires that: (1) the frequencies of the two gain lines differ by at least three halves the breadth B of the widest gain line; (2) the minimum spacing between cavity resonances be no smaller than B; and (3) the cavity length be such that one of the gain lines coincides with a cavity resonance while the other is halfway between resonances. Inasmuch as this would permit a two-fold reduction in the mode spacing illustrated in FIG. 2, this mode of operation would also permit a two-fold longer plasma tube and further only require half the maximum field strength to switch frequencies. In the case of the He-Ne lines previously cited, operation with $1/2L_{max} = B$ results in an $L_{max}$ of 21 cm and an $H_{max}$ of 226 Oersteds.

In the modes of operation so far described, the mode comb is so placed that one of the gain lines is at a cavity resonant frequency when the other is halfway between resonances. As a result, one of the gain lines may lase at either or both of the resonant frequencies its Zeeman-split components are displaced to. The intederminancy of the particular cavity resonant frequency, $x_1$ or $x_2$, at which the normally non-oscillating gain peak of FIG. 2 will oscillate when Zeeman shifted may be obviated by setting the cavity length such that the product of path length and gain peak frequency difference $2L(\nu_B - \nu_A)$, while not an integer is also not an odd half-integer. This will allow one of the gain lines to be centered about a resonant frequency while the other is asymmetrically located, as is shown for $\nu_B$ and $\nu_A$, respectively, in FIG. 3A. Provided the gain peak which is not coincident with a cavity resonance ($\nu_A$) is displaced from the nearest cavity resonant frequency ($x_2$) by at least half its breadth, in the absence of a magnetic field the laser will oscillate at the cavity resonant frequency nearest $\nu_B$, and not at $\nu_A$. As solenoids 52 and 54 are progressively energized, the asymmetric disposition of the gain peak at $\nu_A$ relative to the comb of cavity resonant frequencies will result in one of its Zeeman shifted satellites, such as the satellite a frequency $x_2$ in FIG. 3C, reaching a cavity resonant frequency before the other. Accordingly, this gain peak will, when Zeeman shifted, oscillate at frequency $x_2$ before the oppositely shifted satellite peak reaches its corresponding cavity resonant frequency $x_1$. Thus, offsetting the comb of cavity resonant frequencies relative to the normally non-oscillating gain peak and limiting the maximum field strength to that required to effect the oscillation of only one satellite peak removes the indeterminancy encountered in the symmetric location of cavity resonant frequencies with regard to the normally non-oscillating gain peak.

It will be understood that the non-oscillating condition corresponding to half magnetic field strength (as depicted in FIG. 2B) is only possible if the gain line centered on a cavity resonance (shown in FIGS. 2 and 3 as $\nu_B$) may be split into two components displaced from the central line by at least half the line width, B, before one of the satellites of the other line ($\nu_A$) reaches the nearest cavity resonance. Consequently, the second line must be spaced at least the line width B from the nearest cavity resonance ($x_2$ of FIG. 3) if chopped operation is desired. In this mode of operation, the minimum displacement which will produce matching of the normally non-oscillating line with a cavity resonance is $\Delta\nu = B$, and in this position the skirt of the other satellite of the line is $2\frac{1}{2}B$ away from this resonant frequency. To avoid indeterminancy with this configuration thus requires a minimum mode spacing of $1/2L_{max} = 5B/2$ or $L_{max} = 1/5B$, in which case the normally non-oscillating line must be displaced from the nearest resonance by 2/5 the mode spacing.

For non-chopped operation, resolution of the normally oscillating line into its two satellites is not required before the peak of a satellite of the other line becomes coincident with a cavity resonance. In this case, the extent of the Zeeman-split line is substantially twice its normal breadth, and the coincident triplet extends from the coincident frequency by $3B/2$. The smallest mode spacing which insures oscillation of this line at only a single frequency is therefore $1/2L_{max} = 3B/2$, and $L_{max} = 1/3B$. The normally non-oscillating line must be displaced from the nearest cavity resonance by 1/3 the mode spacing.

It should be noted that while the hereinbefore given optical path lengths apply to the general case, under certain circumstances longer path lengths may be satisfactory. If the transitions corresponding to the two frequencies originate from the same upper energy level, it is possible for oscillation at the frequency having the higher gain to so deplete the upper level that oscillation at the other frequency is inhibited. This is the case, for instance, with the 2947.90 cm$^{-1}$ and the 2948.79 cm$^{-1}$ gain peaks of neon, both of which originate at the $3s_2$ level, or the 3771.00 cm$^{-1}$ and the 4933.93 cm$^{-1}$ gain peaks of xenon, both of which originate at the $3d_2$ level. In such cases, the cavity may be made longer, and the mode spacing correspondingly closer, up to the point that in the absence of the magnetic field the edge of the non-oscillating line encroaches on one or both of the adjacent mode frequencies. Oscillation is suppressed at these frequencies because oscillation at $\nu_B$ has reduced the gain at $\nu_A$ below its normal value. It will be appreciated that in this case, for those embodiments of the invention which do not chop the output of the laser (except as noted below), the spacing between modes may be even less than B.

From the considerations described above, it follows that, in general, when $L=L_{max}=1/2B$, the output of the laser cannot be chopped. An important exception to this occurs when the non-oscillating line (at $\nu_A$) has a gain-per-unit-length of more than twice that of the oscillating line (at $\nu_B$); this is the case for the lines mentioned above, for example. Because the Zeeman-split line components each have half the gain of the (similarly polarized) unsplit line, it is then possible to select the total loss in the cavity so that the line at $\nu_B$ and the split components of the line at $\nu_A$ can each sustain oscillation while the split components of the line at $\nu_B$ cannot. In such a system, increasing the magnetic field beyond the value that tunes the laser to $\nu_A$ extinguishes all oscillation as the components of the line at $\nu_A$ move away from the adjacent mode frequencies. Thus, the advantage of chopping and maximum cavity length may be achieved simultaneously.

Figure 4:
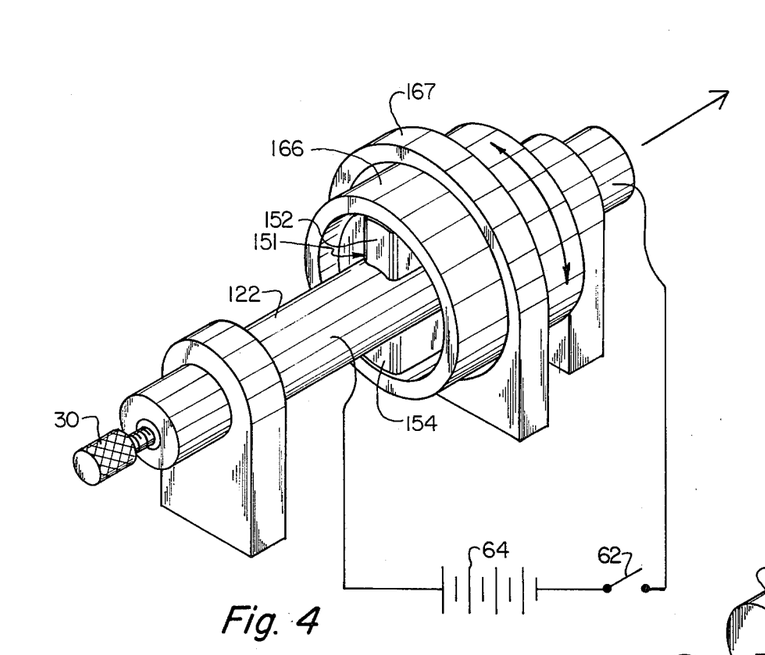
FIG. 4 is a schematic view of an alternative apparatus embodying the principles of the present invention.

Yet other variations may be made in the practice of the present invention. Thus, for instance, the magnetic field strength may be kept constant at $H_{max}$, and its direction relative to the direction of Brewster window 36 varied, as by rotating either the magnet or the laser tube about the longitudinal axis of the tube. In this approach, the satellite gain peaks would remain displaced a constant frequency difference from the central peaks while the changing orientation of the electric vectors of the radiation corresponding to each peak and the plane of polarization of the Brewster window would alternately spoil the satellite or central peaks, shifting between the gain lines represented respectively by the broken and solid curves of FIG. 2C or 3C. Thus, as may be seen in FIG. 4, a permanent magnet 151 having pole pieces 152 and 154 may be mounted on a section of cylindrical tube 166 which is so supported by journal 167 mounted concentrically to tube 122 as to allow tube 166 and the attached magnet to rotate about the longitudinal axis of tube 122. It will be appreciated that only a 90° rotation of the relative directions of the field and the polarizer is required to effect such a change. In all other respects, the system of FIG. 4 may be the same as that of FIG. 1.

Figure 5:
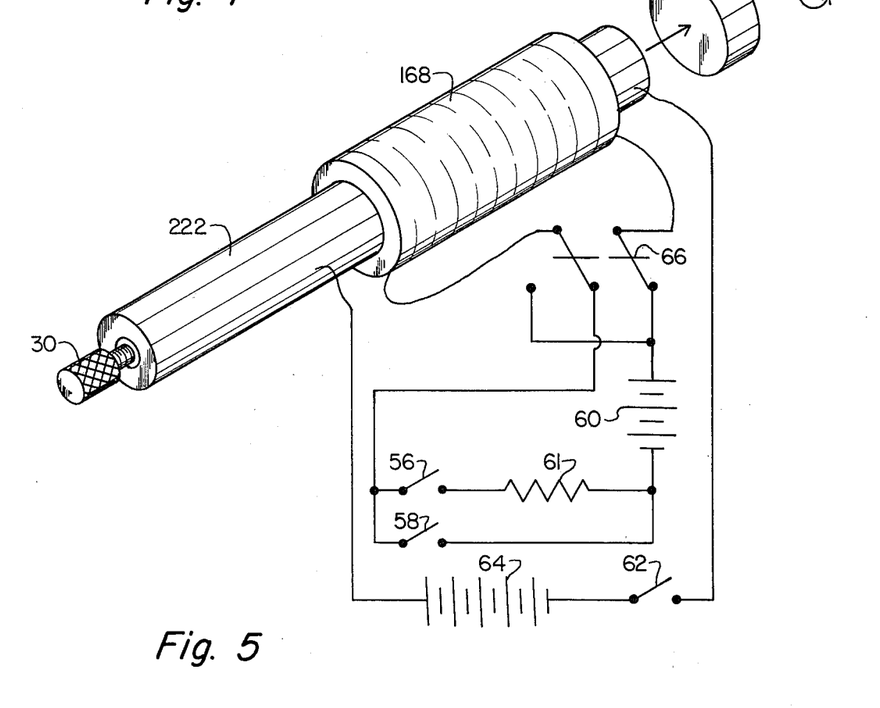
FIG. 5 is a view of yet another embodiment of the invention.

Yet again, the solenoids may be wrapped coaxially about the plasma tube, and the normal longitudinal Zeeman effect utilized, as illustrated schematically in FIG. 5, where a single solenoid 168 is disposed coaxially about tube 222. In this arrangement, the application of the magnetic field results in a pair of displaced satellite peaks, each circularly polarized but in opposite directions, and no central peak. The magnitude of the displacement is the same as in the transverse effect, and the disappearance of the central peak makes it unnecessary to utilize a polarizer in the system to reject the central component when the field is activated. In fact, for this embodiment the laser cavity must not contain any polarizing elements, and thus it should be built either without any window, the mirrors being sealed directly to the plasma tube, or with a non-polarizing window, such as an anti-reflection coated window normal to the optical axis, both as are well known art. Otherwise, the system of FIG. 5 may be similar to that of FIG. 1.

It will be appreciated, however, that this embodiment suffers a defect as compared to the previously described embodiments in that while the radiation at the Zeeman shifted frequencies has a well defined (circular) polarization, the polarization of the radiation at the non-shifted frequencies is indeterminate and will depend on generally uncontrolled factors (e.g., residual birefringence in the mirror coatings, the small residual magnetic field present in almost any practical magnetic circuit, etc.). Thus, operating this embodiment in the same manner as the previously described embodiments might not be desireable in all applications (e.g., in systems in which a polarization sensitive detector might produce erroneous results). The problem may be resolved, however, by incorporating a means for reversing the magnetic field, as double-pole double-throw switch 66, which may be used to reverse the polarity of the current supplied solenoid 168, and a combined quarter-wave plate and linear polarizer 68, or some similar circular polarizing element, in the optical path outside the cavity.

Figure 6A:
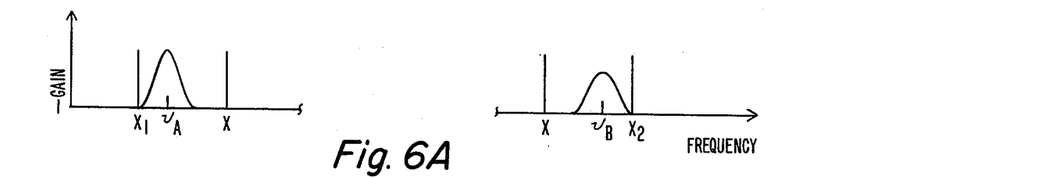
FIGS. 6A through 6C are plots similar to those of FIGS. 2 and 3 illustrative of a mode of operation of the embodiment of FIG. 5.
Figure 6B:
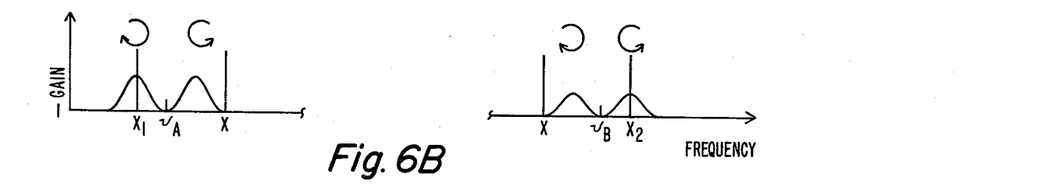
Figure 6C:
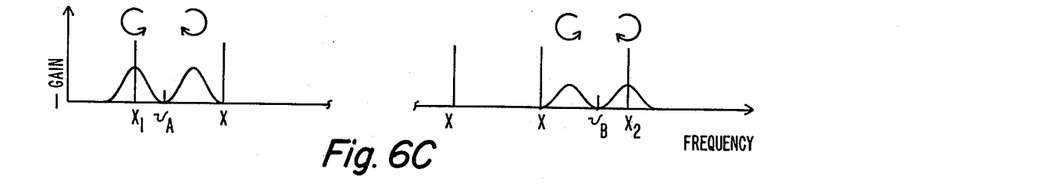

Refering to FIG. 6, there may be seen a representation, similar to those of FIGS. 2 and 3, of a pair of gain lines nominally at $\nu_A$ and $\nu_B$. The spacing between cavity resonances, $1/2L$, has been set at 3/2 times the greater than unity system gain line width, and the cavity resonances have been adjusted so that the magnetically undisturbed gain lines are situated 1/3 of the mode spacing respectively above and below the nearest cavity resonances, $x_1$ and $x_2$. This latter condition may be met by disposing the comb of resonant frequencies symmetrically with respect to the pair by making the average frequency either coincident with a resonance or midway between resonances, while further choosing L such that the reciprocal of twice the path length is commensurate with the difference in gain line frequencies D plus or minus a line width B.

In the absence of a magnetic field, this configuration results in the situation depicted in FIG. 6A; neither gain line is at a cavity resonance, and lasing action does not occur. If solenoid 168 is activated, as by closing switch 58, Zeeman spliting occurs, and the situation is as illustrated in either FIG. 6B or 6C, the difference between the figures depending on the direction of the magnetic field vector. The lower frequency component of $\nu_A$ is shifted to cavity resonant frequency $x_1$ while the higher frequency component of $\nu_B$ is shifted to resonant frequency $x_2$, and lasing action may occur at both of these resonant frequencies.

For a magnetic field vector directed in the direction of propagation, the down-frequency component of each line exhibits right-handed polarization, as depicted by the clockwise arrows of FIG. 6B. For the same field, the up-frequency components are left-hand circularly polarized, as symbolized by the counterclockwise arrows. Thus, the application of the field in this case results in possible lasing action producing right-handed polarized radiation at frequency $x_1$ and left-handed polarized radiation at frequency $x_2$. Reversing the magnetic field, as by positioning switch 66 in its alternate position, results in the situation depicted in FIG. 6C, with the radiation at frequency $x_1$ left-hand polarized and that at frequency $x_2$ right-hand polarized. Consequently, circular polarizing element 68, set to select the desired polarization, may be used in combination with a reversing magnetic field to effect switching between frequency $x_1$ and frequency $x_2$. Thus, if circular polarizing element 68 were a combination of a quarter wave plate and a birefringent prism, then the right- and left-handed circularly polarized beams would be deflected in two different directions, as shown schematically in FIG. 5 (although it will be understood the two beams projected from the system would be linearly polarized, rather than circularly polarized).

If the chopping action which may be achieved by removing the magnetic field is not desired, then the mode spacing may be decreased. Setting the mode spacing to be B and the separation between gain lines and resonances to be B/4 results in a system in which the maximum field strength need only be sufficient to produce a quarter linewidth shift, but which cannot be magnetically caused to not oscillate.

Figure 7:
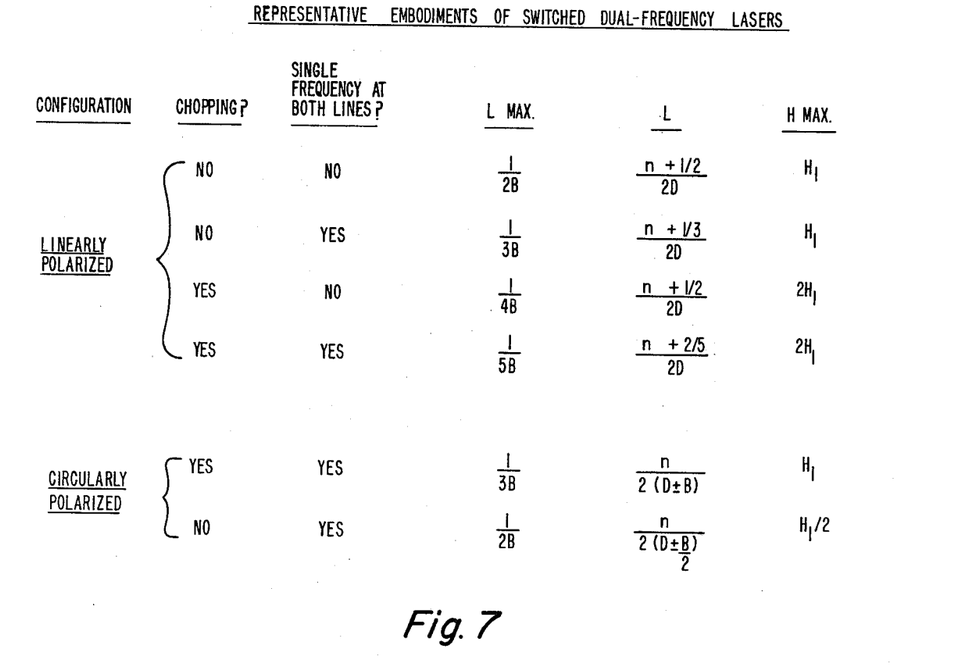
FIG. 7 is a table summarizing design parameters for a variety of embodiments of the invention.

It will be appreciated that the the examples given are illustrative, and that various mode spacings and gain line and cavity resonance alignments may be used in the practice of the invention, depending on the desired results. As has been indicated hereinbefore, single determinate frequency operation at both lines requires a non-symmetric placement, relative to at lest one line, of the mode comb. Further, if it is desired to interrupt the light source between frequency shifting (as may be of advantge with synchronous detection schemes commonly encountered in infrared engineering), then commonly a large mode spacing, with an attendant short cavity and large magnetic field, is required. The table presented in FIG. 7 summarizes the configurations discussed hereinbefore in terms of the maximum cavity length, $L_{max}$, which is dependent on linewidth, the (generally slightly smaller) tuned length, L, which accommodates line and comb spacing, and the required maximum magnetic field, $H_{max}$. In the table, B corresponds to the bandwidth, in wavenumbers, over which gain exceeds loss for the wider of the gain lines (or the widest component thereof, in the case of the anomolous Zeeman effect), $H_1$ is the approximate field strength required to split the line into components at frequencies $\pm B/2$ different from the initial frequency, and the difference in frequencies between the pair of transitions is $D = \nu_B - \nu_A$, and n is the largest integer for which L is less than or equal to $L_{max}$. Only those configuration resulting in determinate polarization of the output are included in the table. It should also be noted that the table has been restricted to the simplest configurations, and that, in practice, B should incorporate a safety factor to allow for a margin of error in the empirically determined line widths, tuning control, and the like.

Various other changes may be incorporated into the design to facilitate operation. Thus, the systems described so far are provided with a precision nut 28 and screw 30 so supporting mirror 26 that the cavity length may be adjusted so as to tune the cavity resonances for the particular mode of operation. Obviously, for a specific mode of operation, the cavity length of a given laser may be permanently set during manufacture. Those skilled in the laser arts will recognize that such a system would normally have to be retuned to compensate for thermal and pressure changes unless tube 22 is of low expansion material or incorporates a thermally compensating structure and is so sealed as to prevent any influence from changes in atmospheric pressure or composition. As previously mentioned, mirror 26 might also be supported on a piezoelectric element or similar actuator, and those skilled in the art will appreciate that such an actuator may be a part of a control loop which stabilizes the tuning of the cavity. Inasmuch as changes in temperature or atmospheric pressure affecting cavity tuning are likely to be slowly varying functions of time, a slowly reacting control loop is all that is necessary, and consequently the mirror actuator need be nothing more than a simple heating element surrounding a portion of tube 22.

Since these and other changes may be made in the described embodiment without departing from the scope of the invention herein involved, it is intended that all matter contained in the above description or shown in the accompanying drawings shall be interpreted in an illustrative and not in a limiting sense.

What is claimed is:

1. In a laser oscillator having a resonant optical cavity including an optical axis, at least a portion of said cavity containing an active gaseous material capable of supporting laser action over a first limited frequency range and a second limited frequency range remote from one another and centered respectively at a first center frequency and a second center frequency, said cavity being tuned such that simultaneously (a) adjacent resonant frequencies thereof are spaced apart by a frequency spacing which has a magnitude at least of the order of one of said limited frequency ranges, (b) the difference in frequency between said first center frequency and said second center frequency is a non-integral multiple of said frequency spacing, and (c) one of said resonant frequencies substantially coincides with said first center frequency; the improvement comprising, means for providing a magnetic field in said active gaseous material so as to produce Zeeman-splitting which characteristically serves to divide each of said limited frequency ranges into a plurality of similar secondary frequency ranges, said magnetic field having an operating field strength sufficient simultaneously to frequency-shift ones of said secondary frequency ranges centered at said first center frequency away from said first center frequency by a frequency increment on the order of at least half of said first limited frequency range, and to frequency-shift ones of said secondary frequency ranges centered at said second center frequency away from said second center frequency by a frequency increment on the order of at least the frequency difference between said second center frequency and an adjacent one of said resonant frequencies; and means for varying said magnetic field so as to control the intensity and frequency of electromagnetic radiation generated by said laser oscillator.

2. The improvement in a laser oscillator according to claim 1 wherein said means for varying constitutes means for alternatively selecting the frequencies of said radiation at either said first center frequency or at said one of said resonant frequencies adjacent said second center frequency.

3. The improvement in a laser oscillator according to claim 1 wherein said means for varying said magnetic field can vary said field strength between substantially zero and at least said operating field strength, said means for providing said field being disposed to produce said magnetic field with a predominant field direction fixed in a first direction relative to said optical axis at said portion of said optical cavity.

4. The improvement in a laser oscillator according to claim 3 wherein said first direction is substantially normal to said optical axis within said portion of said cavity and wherein additionally said optical cavity is provided with polarizing means for selectively removing from interaction within said optical cavity such electromagnetic radiation generated by said active gaseous material and propagating parallel to said optical axis as has an electric field vector parallel to said first direction.

5. The improvement in a laser oscillator according to claim 3 wherein said first direction is substantially parallel to said optical axis within said portion of said optical cavity.

6. The improvement in a laser oscillator according to claim 1 wherein said optical cavity is provided with polarizing means for selectively removing from interaction within said optical cavity such electromagnetic radiation generated by said active gaseous material and propagating parallel to said optical axis as has an electric field vector oriented in a given direction, wherein said means for producing said magnetic field can provide a substantially constant magnetic field strength with a predominant field direction, and wherein said means for varying said magnetic field can alter said predominant field direction relative to said polarizing means so as to alternately bring said predominant field direction parallel to and normal to said given direction.

7. A laser oscillator comprising in combination:
a resonant optical cavity including an optical axis, at least a portion of said cavity containing an active gaseous material capable of supporting laser action over a first limited frequency range and a second limited frequency range centered respectively at a first center frequency and a second center frequency remote from one another and equidistant from a third frequency, said cavity being tuned such that simultaneously (a) adjacent resonant frequencies thereof are spaced apart by a frequency spacing which has a magnitude at least on the order of one of said limited frequency ranges, (b) said resonant frequencies respectively nearest said first and second center frequencies are respectively disposed to be displaced therefrom by equal frequency differences on the order of at least one quarter of said one of said limited frequency range, and (c) said resonant frequencies are disposed substantially symmetrically about said third frequency;
means for providing a magnetic field in said active gaseous material so as to product Zeeman-splitting which characteristically serves to divide each of said limited frequency ranges into a plurality of similar secondary frequency ranges, said magnetic field having a predominant field direction substantially parallel to said optical axis within said portion of said cavity and having an operating field strength sufficient to frequency-shift ones of said secondary frequency ranges away from the respective said first and second center frequencies a frequency increment on the order of at least the frequency difference between said first and second center frequencies and the respectively nearest resonant frequencies; and
means for varying said magnetic field so that said predominant field direction may be selectively reversed relative to said optical axis.

8. Apparatus according to claim 7 and further including means for selecting circularly polarized electromagnetic radiation of a given handedness generated by said gaseous material and initially propagating parallel to said optical axis within said portion.

9. A method for controlling the output of a laser oscillator including a resonant optical cavity having an optical axis, at least a portion of said cavity containing an active gaseous material capable of supporting laser action over a first limited frequency range and a second limited frequency range remote from one another and centered respectively at a first center frequency and a second center frequency, said method comprising the steps of:
 (1) tuning said cavity such that simultaneously (a) adjacent resonant frequencies thereof are spaced apart by a frequency spacing which has a magnitude at least of the order of one of said limited frequency ranges, (b) the difference in frequency between said first center frequency and said second center frequency is a non-integral multiple of said frequency spacing, and (c) one of said resonant frequencies substantially coincides with said first center frequency;
 (2) subjecting said active gaseous material in said cavity to a magnetic field so as to divide each of said limited frequency ranges into a plurality of similar secondary frequency ranges by Zeeman-splitting, said magnetic field having an operating field strength sufficient simultaneously to frequency-shift ones of said secondary frequency ranges centered at said first center frequency away from said first center frequency by a frequency increment on the order of at least half of said first limited frequency range, and to frequency-shift ones of said secondary frequency ranges centered at said second center frequency away from said second center frequency a frequency increment on the order of at least the frequency difference between said second center frequency and an adjacent one of said resonant frequencies; and
 (3) varying said magnetic field so that the intensity and frequency of the electromagnetic radiation generated by said laser oscillator may be controlled.

10. The method according to claim 9 wherein selective control of said electromagnetic radiation includes alternative selection of frequencies of said radiation to be at said first center frequency and at said one of said resonant frequencies adjacent said second center frequency.

11. The method according to claim 9 wherein the step of varying said magnetic field comprises varying the field strength of said magnetic field between substantially zero and at least said operating field strength, said magnetic field being disposed with a predominant field direction fixed relative to said optical axis at said portion of said optical cavity.

12. The method according to claim 11 wherein said predominant field direction is disposed substantially normal to said optical axis within said portion, said method further including the step of selectively removing from interaction with said optical cavity electromagnetic radiation generated by said active gaseous material propagating parallel to said optical axis and having an electric field vector parallel to said predominant field direction.

13. The method according to claim 11 wherein said predominant field direction is disposed substantially parallel to said optical axis within said portion.

14. The method according to claim 9 wherein said magnetic field has a constant magnetic field strength substantially equal to said operating field strength and is disposed with a predominant field direction normal to said optical axis at said portion of said cavity, said method further including the step of selectively removing from interaction within said optical cavity electromagnetic radiation generated by said active gaseous material propagating parallel to said optical axis and having an electric field vector oriented in a given direction, said step of varying said magnetic field comprising alternately bringing said predominant field direction substantially parallel to and normal to said given direction.

15. A method for controlling the output of a laser oscillator including a resonant optical cavity having an optical axis, at least a portion of said cavity containing an active gaseous material capable of supporting laser action over a first limited frequency range and a second limited frequency range remote from one another and centered respectively at a first center frequency and a second center frequency and equidistant from a third frequency, said method comprising the steps of:

(1) tuning said cavity such that simultaneously (a) adjacent resonant frequencies are spaced apart by a frequency spacing which has a magnitude at least on the order of one of said limited frequency ranges, (b) said resonant frequencies respectively nearest said first and second center frequencies are respectively displaced therefrom by substantially equal frequency differences of a magnitude on the order of at least one quarter of one said limited frequency range, and (c) said resonant frequencies are disposed symmetrically about said third frequency;

(2) subjecting said active gaseous material in said cavity to a magnetic field so as to divide each of said first and second limited frequency ranges into a plurality of similar secondary frequency ranges by Zeeman-splitting, wherein said magnetic field has a predominant field direction substantially parallel said optical axis within said portion and has an operating field strength sufficient to frequency-shift ones of said secondary frequency ranges respectively centered at said first and second center frequencies away from the respective first and second center frequencies a frequency increment on the order of at least the frequency difference between said first and second center frequencies and respective adjacent ones of said resonant frequencies; and (3) substantially reversing the direction of said magnetic field.

16. The method according to claim 15 and further including the step of selecting circularly polarized electromagnetic radiation of a given handedness generated by said active gaseous material and initially propagating parallel to said optical axis.

* * * * *